United States Patent Office 3,293,505
Patented Dec. 20, 1966

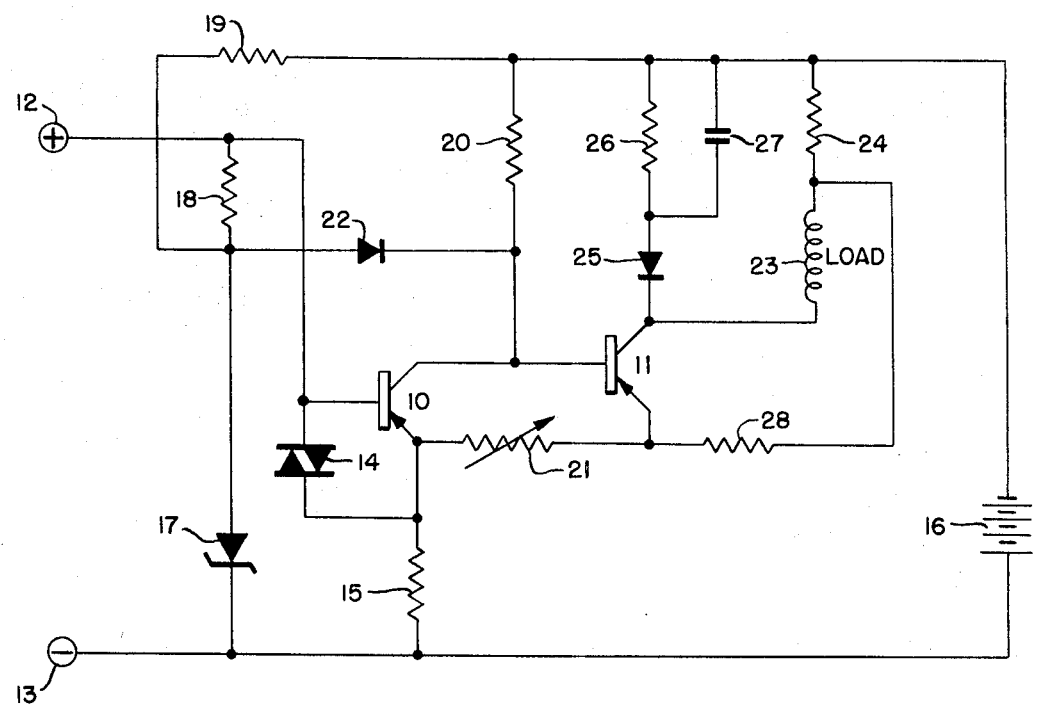

1

3,293,505
CONSTANT CURRENT SELECTOR
MAGNET DRIVER
Raymond J. Miller, Skokie, Ill., assignor to Teletype Corporation, Skokie, Ill., a corporation of Delaware
Filed May 29, 1963, Ser. No. 284,211
9 Claims. (Cl. 317—148.5)

This invention relates to a circuit for energizing an inductor and more particularly to a constant current energizing circuit for the coil of a selector magnet employed in teletypewriter machines.

As is well known in the art, the selector magnets of teletypewriter machines respond to binary input signals of substantially rectangular current wave form characteristics. The signals are usually represented by current flowing on the line designating a "mark" pulse and by no current or an open line condition representing a "space" pulse. The "mark" and "space" pulses are generally encoded in groups of five or more information pulses preceded by a start pulse and terminated by a stop pulse. The information pulses are arranged in permutation code with the start pulse always being represented by a "spacing" condition and the stop pulse being represented by a "marking" condition. These pulses, as received by the selector magnet driver, cause the coil of the selector magnet to be energized for each mark pulse and to be deenergized for each space pulse. The manner in which the selector magnet operates in a teletypewriter machine to cause printing or punching of the character represented by the information pulses is described more fully in United States Patent No. 2,339,313 issued to W. J. Zenner on January 18, 1944.

In some teletypewriter applications there is a need for a selector magnet driver which will provide a constant current through the selector magnet coil in spite of variations in the local direct current power supply or variations in the impedance of the selector magnet coil or the current limiting resistor connected in series with the coil.

Variations in the selector magnet current result in varying operate and release times of the selector in teletypewriter machines such as those described in the aforementioned Zenner patent. This is reflected as loss of signaling margin in the selector attached to the magnet. Constant current through the selector magnet coil provides constant magnet release time, thereby eliminating margin loss due to magnet release variations.

Prior to this invention when it was desirable to obtain a predetermined current from a selector magnet driver, it was necessary to make an adjustment in the field of the resistance of the current limiting resistor placed in series with the coil of the selector magnet. This adjustment had to be made independently for each machine in which a selector magnet driver was used and necessitated the use of additional test equipment each time a new selector magnet coil or current limiting resistor was installed or each time the power supply voltage varied. Even after such adjustments were made, changes in the resistances of the current limiting resistor and the selector magnet coil or variations in the power supply voltage were not compensated for by the selector magnet driver; and the current through the selector magnet coil varied accordingly. As a result, operational variations occurred.

Accordingly, it is an object of this invention to provide a selector magnet driver which causes a constant current to flow through the selector magnet coil irrespective of variations of impedance in the coil or the current limiting

2 resistor or variations in the voltage of the direct current supply.

It is an additional object of this invention to provide a selector magnet driver having an accurately controlled input switching level.

It is another object of this invention to provide a selector magnet driver in which only an initial adjustment is necessary to cause the selector magnet driver to supply constant current through any selector magnet coil subsequently used in conjunction with the driver.

In a preferred embodiment of this invention for accomplishing the above and additional objects, a selector magnet driver is constructed utilizing a pair of transistors connected in a Schmitt trigger circuit configuration. The output transistor is a power transistor, and it has its collector connected in series with the selector magnet coil and a current limiting resistor. A stabilized reference voltage is provided and is connected to the input transistor to control the level at which the input line signals cause this transistor to be rendered conductive and nonconductive. Whenever the input transistor is conductive, the output transistor is rendered nonconductive and nonresponsive to the stabilized reference voltage. However, when the input transistor is rendered nonconductive, the output transistor conducts and its conduction then is controlled by the stabilized reference voltage which causes the output transistor to maintain a predetermined constant current flowing through it and the coil of the selector magnet irrespective of variations in the direct current power supply or variations of the impedance of the coil or the current limiting resistor.

Further objects and features of this invention will become apparent to those skilled in the art upon consideration of the following detailed specification taken in conjunction with the drawing, the single figure of which shows a preferred embodiment of this invention.

Referring now to the drawing, an inductor or selector magnet driving circuit is shown which includes a pair of transistors 10 and 11 connected in a Schmitt trigger circuit configuration. For the purpose of illustrating the invention, the transistors 10 and 11 are shown as PNP transistors. However, it should be expressly understood that each of these transistors may be replaced by transistors of the opposite conductive type if proper voltage and diode polarity changes are made in the circuit.

Coupled to the base and emitter electrodes of the transistor 10 is an input circuit which includes a pair of signal line input terminals 12 and 13. A varistor 14 and resistor 15 are connected in series between the terminals 12 and 13. The emitter of the transistor 10 is connected to the junction of the varistor 14 and the resistor 15, and the base of the transistor 10 is connected directly to the terminal 12. Whenever a mark appears on the line, current flows from the terminal 12 through the varistor 14 and resistor 15 to the terminal 13 thereby causing the base of the transistor 10 to be driven positive with respect to its emitter due to the voltage drop across the varistor 14. This operation will be explained more fully hereinafter. When a space appears on the line, no current flows on the line between the terminals 12 and 13; and the operation of the transistors 10 and 11 is under the exclusive control of the local D.C. power supply represented by a battery 6.

With the line circuit open (spacing) the transistor 10 is rendered conductive by a stabilized reference voltage established by a Zener diode 17. This reference potential is coupled to the base of the transistor 10 through a resistor 18 and is more negative than the potential applied to the emitter of the transistor 10 through a voltage divider comprising resistors 15, 21, 28 and 24.

The value of the resistor 18 is chosen to cause the emitter-base current flow through the transistor 10 to be approximately one-half the final value of the line current when a mark appears on the line. This emitter-base current is constant and is considerably in excess of that needed to drive the transistor 10 into saturation, but this value is chosen to establish the desired switching level of the transistor 10 as set forth in detail in the subsequent discussion of the operation of this portion of the circuit.

As is well known in the art, the Zener diode 17 exhibits a constant voltage drop thereacross for all values of current flowing through it in the reverse direction after its avalanche potential is exceeded. In the circuit shown in the drawing, the Zener diode 17 is connected in series with a resistor 19 across the terminals of the battery 16 to provide the necessary current path for operating the Zener diode 17 which is operated above its avalanche potential on the flat portion of its voltage-current characteristic curve.

The stabilized negative reference potential applied to the base of the transistor 10 causes the transistor to conduct current through a path extending from the positive terminal of the battery 16 through the resistor 15, the emitter-collector path of the transistor 10 and a resistor 20 to the negative terminal of the battery 16. When the transistor 10 is conductive, the transistor 11 is biased nonconductive since potential on the collector of the transistor 10 is applied directly to the base of the transistor 10 thereby biasing that transistor off. A variable resistor 21 provides a potential drop between the emitter of the transistor 10 and the emitter of the transistor 11 to insure that the emitter potential of the transistor 11 is negative with respect to the potential applied to its base from the collector of the transistor 10 when the transistor 10 is rendered conductive. If the resistor 21 were not provided in the circuit between the emitters of the transistors 10 and 11, the transistor 11 might not be rendered nonconductive at the time the transistor 10 conducts since the emitter potential of the transistor 11 then would be the same or perhaps slightly above the potential applied to the base of the transistor 11 from the collector of the transistor 10. The resistor 21 prevents this from happening.

When the transistor 10 is rendered conductive, as stated previously, the stabilized reference voltage from the Zener diode 17 is prevented from being applied to the base of the transistor 11 since the relatively positive potential on the collector of the transistor 10 back biases a diode 22 connected between the Zener diode 17 and the junction of the collector of the transistor 10 and the base of the transistor 11. The transistor 11 thus is rendered nonresponsive to the reference potential of the Zener diode 17 whenever the transistor 10 conducts.

The selector magnet coil 23 and a current limiting resistor 24 are connected in series between the collector of the transistor 11 and the negative terminal of the battery 16. Thus, when the transistor 11 is rendered nonconductive, as stated above, no current flows through the selector magnet coil 23; and the coil is not energized. This is the desired condition for indicating a space condition on the signal line between the terminals 12 and 13.

Now assume that a space-to-mark transition begins. This is represented by current flowing from the terminal 12 through the varistor 14 and the resistor 15 to the terminal 13; and as this current increases, the emitter-base current of the transistor 10 is decreased by a like amount until the line current just exceeds the normal emitter-base biasing current to turn the transistor 10 off. Since the constant current flowing in the emitter-base circuit of the transistor 10 prior to the space-to-mark transition is chosen to be one-half the value of the final marking line current, as stated previously, the transistor 10 is turned off or rendered nonconducting when the increasing line current reaches approximately one-half of its final value. As the line current continues to increase to its final value, additional current flows from the terminal 12 through the resistors 18 and 19, and the battery 16 to the terminal 13 until the avalanche point of the varistor 14 is exceeded at which time the remainder of the current flows through the varistor 14 and the resistor 15 to the terminal 13. The value of line current at which the transistor 10 changes from a conductive state to a nonconductive state is always the same, and it is precisely controlled by the value of the constant normal emitter-base biasing current established by the Zener diode 17 and the resistor 18 and by the gain of the transistor 10.

When the transistor 10 is rendered nonconductive, the diode 22 is no longer back biased; and the negative reference voltage established by the Zener diode 17 is applied through the diode 22 to the base of the transistor 11. This reference potential causes the base of the transistor 11 to be driven negative with respect to the potential on its emitter, and the transistor 11 conducts. As the transistor 11 conducts, an increase in its emitter current occurs which causes an increase in the negative potential at the emitter of the transistor 10 driving it further into its nonconductive state. The current flowing through the transistor 11 and thus the selector magnet coil 23 and current limiting resistor 24 increases until the current in the selector magnet coil 23 reaches a predetermined value.

In order to establish the desired predetermined current flow in the path from the battery 16 through the resistors 15 and 21, the transistor 11, the coil 23, and the resistor 24 back to the battery 16, the value of the resistor 21 initially is adjusted to compensate for component variations. Once this initial adjustment is made, no further circuit adjustments are necessary in the subsequent operation of the circuit. This is explained hereinafter in the detailed description of the operation of the circuit.

As the line current completes the transition to the final marking current value, the base of the transistor 10 becomes positively biased to a potential which is clamped to a predetermined value by the input protecting varistor 14. The varistor 14 also prevents any damage from occurring to the transistor 10 due to any sudden surges taking place on the line in either direction.

Assume now that the line current next changes from a marking condition, as described above, to a spacing condition in which no current flows on the line between the terminals 12 and 13. When this occurs, the line current applied to the base of the transistor 10 decreases until it reads one-half its final value, and the point is reached where it drops just below the stabilized constant emitter-base bias current established by the Zener diode 17 and the resistor 18. At this time, the base of the transistor 10 is biased negatively with respect to its emitter, thereby causing the transistor 10 to conduct. As the transistor 10 begins to conduct, the potential applied to the base of the transistor 11 rises and the diode 22 is back biased causing the transistor 11 to be rendered nonconductive. As the transistor 11 turns off, the potential applied to the emitter of the transistor 10 rises causing the transistor 10 to be fully turned on. This effect gives regeneration to the mark-to-space transition and causes a rapid snap-action type of switching to take place in the trigger circuit comprised of the transistors 10 and 11.

When the transistor 11 is turned off, a negative voltage transient is developed at the collector of the transistor 11 due to the dissipation of the energy stored in the magnetic field of the selector magnet coil 23. This negative transient is more negative than the potential at the negative terminal of the battery 16 and causes a diode 25 to conduct to pass the transient through a resistance-capacitance network, comprised of a resistor 26 and a capacitor 27, which limits the transient to a value below the breakdown voltage of the transistor 11 while the energy in the coil 23 is being dissipated. If the high negative voltage developed at the collector of the transistor 11 is not limited, it would continue to rise until the collector to emitter breakdown voltage of the transistor is exceeded. It has been found that repeated breakdown of this type causes deterioration of the transistor and finally a collector to emitter short circuit. The diode 25 isolates the network from voltages more positive than the negative potential of the D.C. source 16. Thus, the only time current flows through the resistance-capacitance network is during the suppression of switching transient described above.

The manner in which the circuit provides a constant energizing current through the coil 23 for mark input signals now will be described in greater detail. As stated previously, when a mark is present on the line, the transistor 11 is rendered conductive and the potential applied to its base is the stabilized negative potential established by the Zener diode 17. The resistance between the emitter of the transistor 11 and the positive terminal of the battery 16 is constant once it has been adjusted initially by varying the resistance of the variable resistor 21. If the potential of the battery 16 rises, increased current flows through the Zener diode 17 but the reference voltage coupled to the base of the transistor 11 through the diode 22 does not vary relative to the emitter circuit potential obtained from the positive terminal of the battery 16 due to the fact that the voltage drop across the diode 17 does not vary with variations in the current flowing therethrough. The increased potential of the battery 16 tends to cause increased current to flow through the coil 23 and the resistances 15 and 21. This tends to cause the emitter of the transistor 11 to become biased more negatively with respect to the constant potential applied to its base thereby rendering the transistor less conductive. As a result, the impedance of the transistor rises to maintain the desired predetermined current flow through the path including the coil 23.

On the other hand, if the potential of the D.C. source 16 drops, the current through the Zener diode 17 decreases but the potential applied to the base of the transistor remains constant. At the same time decreased current tends to flow through the coil 23 and resistances 15 and 21, and the potential on the emitter of the transistor 11 tends to become more positive with respect to the potential on the base due to the decreased voltage drop across the resistors 15 and 21. This results in an increase in the emitter-base current which causes the conductance of the transistor 11 to increase until the predetermined current is attained. It should be noted that in order to effect this type of operation, the transistor 11 must be a power transistor since it must dissipate varying amounts of energy in addition to performing a switching function for mark and space signals.

This operation may be summarized by noting that the constant voltage applied to the base of the transistor 11 restricts the emitter voltage of that transistor from rising above this base voltage, as in any unsaturated transistor amplifying circuit, thereby causing the collector current to be a function of the fixed emitter resistance and the fixed base voltage.

From the foregoing it should be apparent that if the impedance of either the coil 23 or the current limiting resistor 24 is varied, for example, due to replacement of these components or aging, this will have no effect upon the current flowing through the coil 23 since the conductance of the transistor 11 will vary to compensate for such changes. As an example, assume that the D.C. power supply voltage is constant but that the impedance of either the coil 23 or the resistor 24 is increased. This tends to reduce the current flowing through the path consisting of the resistors 15 and 21, the transistor 11, the coil 23 and resistor 24. This reduced current tends to increase the potential at the emitter of the transistor 11 with respect to the stabilized potential applied to its base thereby increasing its conductivity to change the impedance of the path until the desired predetermined current is established. Conversely, if the impedance of the coil 23 or the resistor 24 should be lowered due to replacement or other causes, increased current tends to flow through the above-mentioned path. This results in a lowering of the potential on the emitter of the transistor 11 with respect to the potential applied to its base thereby rendering it less conductive or causing it to have a higher impedance, thus compensating for the lowered impedance of the coil 23 or the resistor 24 sufficiently to cause the desired predetermined current to continue flowing through the coil 23.

It should be noted that the transistor 11 will compensate for variations in voltage of the source 16 or changes in the impedance of the coil 23 over a relatively wide range. However, if a sufficiently large variation of either of these types occurs and exceeds the power handling capacity of the transistor 11, a constant current will not be maintained through the coil 23. Such an occurrence rarely, if ever, will take place in the normal operation of the circuit.

In addition to providing for a constant magnet release time, the circuit of this invention causes the current build-up through the selector magnet coil to rise steeply until the desired constant-current level is reached. When current is first applied to the coil 23, it naturally is far below the desired value, and the transistor 11 then is rendered highly conductive, in the manner previously explained in detail, to cause the current to increase rapidly until the desired constant current level is reached. The circuit of the invention causes a faster build-up of current through the coil 23 than if the current only rose exponentially to a final value. As a result, margin loss in the selector of the teletypewriter machine is further reduced.

While the foregoing circuit has been described as applied to a driving circuit for the selector magnet coil of a teletypewriter machine, it is adapted equally well for use with any electro-magnet or inductive load circuit where a constant energizing current is desired. It will be apparent to those skilled in the art that various changes and modifications may be made in the disclosed embodiment without departing from the spirit and scope of the invention.

What is claimed is:
1. A constant current inductor driving circuit including
    (a) an electronic trigger amplifier having at least input and output stages, the input stage normally being in a first state of conduction,
    (b) an inductor connected to the output of the output stage of the trigger amplifier,
    (c) means for establishing a stabilized reference voltage,
    (d) means for periodically applying input signals to the input stage to place the input stage in a second state of conduction, and
    (e) means operative only when the input stage is in said second state of conduction for applying the reference voltage to the output stage to render it conductive, the reference voltage causing a predetermined constant current to flow through the output stage and the inductor when the output stage of the trigger amplifier is rendered conductive.
2. A constant current inductor driving circuit including
    (a) an electronic trigger amplifier having at least input and output stages,
    (b) an inductor connected to the output of the output stage of the trigger amplifier,
    (c) means for establishing a stabilized reference voltage,

(d) means for applying the reference voltage to the input stage to render it normally conductive, (e) means for periodically applying input signals to the input stage to override the effect of the reference voltage and to render the input stage nonconductive, and (f) means operative only when the input stage is nonconductive for applying the reference voltage to the output stage to render it conductive, the reference voltage causing a predetermined constant current to flow through the output stage and the inductor when the output stage of the trigger amplifier is rendered conductive.

3. An inductor driving circuit including (a) a trigger amplifier having at least first and second stages, (b) a stabilized reference voltage, (c) first and second means respectively connecting the stabilized reference voltage to the first and second stages of the trigger amplifier for controlling the conduction of each of the stages, the first stage being rendered normally conductive by the reference voltage, (d) means for rendering the second stage nonresponsive to the reference voltage when the first stage is conductive, (e) means for applying input signals to the first stage to override the effect of the reference voltage and render the first stage nonconductive causing the conduction of the second stage to be controlled by the reference voltage so that a predetermined constant current flows through the second stage when it conducts, and (f) means for connecting the inductor in series with the second stage.

4. A constant current inductor energizing circuit including (a) an electronic trigger amplifier having at least first and second stages including first and second transistors, respectively, each of the transistors having collector, base and emitter electrodes, the collector of the first transistor being connected to the base of the second transistor, (b) an inductor connected in the collector circuit of the second transistor, (c) a stabilized reference voltage, (d) means for applying the reference voltage to the base of the first transistor to render it normally conductive, (e) means for applying an input signal to the base of the first transistor to override the effect of the reference voltage to render the first transistor nonconductive, and (f) means operative only when the first transistor is nonconductive for applying the reference voltage to the base of the second transistor to render it conductive; the reference voltage controlling the conduction of the second transistor to cause a predetermined constant current to flow through the collector circuit of the second transistor.

5. A circuit according to claim 4 wherein the second transistor is a power transistor.

6. A constant current inductor energizing circuit including (a) an electronic trigger amplifier having first and second stages including first and second transistors, respectively, each of the transistors having collector, base and emitter electrodes, the collector of the first transistor being connected to the base of the second transistor, (b) an inductor connected in the collector circuit of the second transistor, (c) a stabilized reference voltage, (d) means for applying the reference voltage to the base of the first transistor to render it normally conductive, (e) means for applying an input signal to the base of the first transistor to override the effect of the reference voltage to render the first transistor nonconductive, and (f) means controlled by the first transistor being driven from a conductive to a nonconductive state for applying the reference voltage to the base of the second transistor to render it conductive; the reference voltage controlling the conduction of the second transistor to cause a predetermined constant current to flow through the collector circuit of the second transistor.

7. A constant current inductor energizing circuit including (a) a first transistor and a second transistor, each having collector, base, and emitter electrodes, the second transistor being a power transistor, (b) means interconnecting the first and second transistors in a trigger circuit with the collector of the first transistor being connected to the base of the second transistor, (c) an inductor connected to the collector of the second transistor in series with its collector-emitter path, (d) a stabilized reference voltage, (e) means for applying the reference voltage to the base of the first transistor to render it normally conductive, (f) means for applying an input signal to the base of the first transistor to override the effect of the reference voltage and to render the first transistor nonconductive, and (g) means operative only when the first transistor is nonconductive for applying the reference voltage to the base of the second transistor to render it conductive, the reference voltage causing the conduction of the second transistor to be varied to compensate for changes in the current flowing through the series current path including the emitter-collector path of the second transistor to cause a predetermined constant current to flow through the collector-emitter path of the second transistor and the inductor.

8. A circuit according to claim 7 where the reference voltage is stabilized by a Zener diode.

9. A constant current inductor energizing circuit including (a) a first transistor and a power transistor, each having collector, base and emitter electrodes, (b) means interconnecting the transistors in a Schmitt trigger circuit with the collector of the first transistor being connected directly to the base of the power transistor, (c) a source of direct current potential, (d) an inductor connected in a series circuit including the direct current source and the collector-emitter path of the power transistor, (e) a Zener diode included in a circuit connected in series with the direct current potential for establishing a stabilized reference voltage, (f) means for applying the stabilized reference voltage to the base of the first transistor to render it normally conductive, the potential on the collector of the first transistor causing the power transistor to be held nonconductive when the first transistor is conductive, (g) means for applying an input signal to the base of the first transistor to override the effect of the reference voltage to render the first transistor nonconductive, and (h) a diode connected between the Zener diode and the base of the power transistor and operative only when the first transistor in nonconductive for applying the stabilized reference voltage to the base of the power transistor to render it conductive, the stabilized reference voltage causing the conduction of the power transistor to vary inversely with variations of the voltage of the direct current source and to vary directly with variations in the impedance of the series path including the emitter-collector path of the power transistor to cause a predetermined constant current to flow through the power transistor and the inductor.

References Cited by the Examiner

UNITED STATES PATENTS

| | | |
|---|---|---|
| 2,979,628 | 4/1961 | Gaon. |
| 3,075,128 | 1/1963 | Cutsogeorge et al. __ 317—148.5 |
| 3,078,393 | 2/1963 | Winston _____ 317—148.5 X |
| 3,112,431 | 11/1963 | Pederson _____ 317—148.5 |
| 3,114,872 | 12/1963 | Allard _____ 323—4 |
| 3,118,601 | 1/1964 | Robb _____ 317—148.5 X |
| 3,131,314 | 4/1964 | Charlot _____ 317—148.5 X |
| 3,133,275 | 5/1964 | Cohrt et al. _____ 317—148.5 X |

MILTON O. HIRSHFIELD, *Primary Examiner.*

SAMUEL BERNSTEIN, MAX L. LEVY, *Examiners.*

L. T. HIX, *Assistant Examiner.*